UNITED STATES PATENT OFFICE.

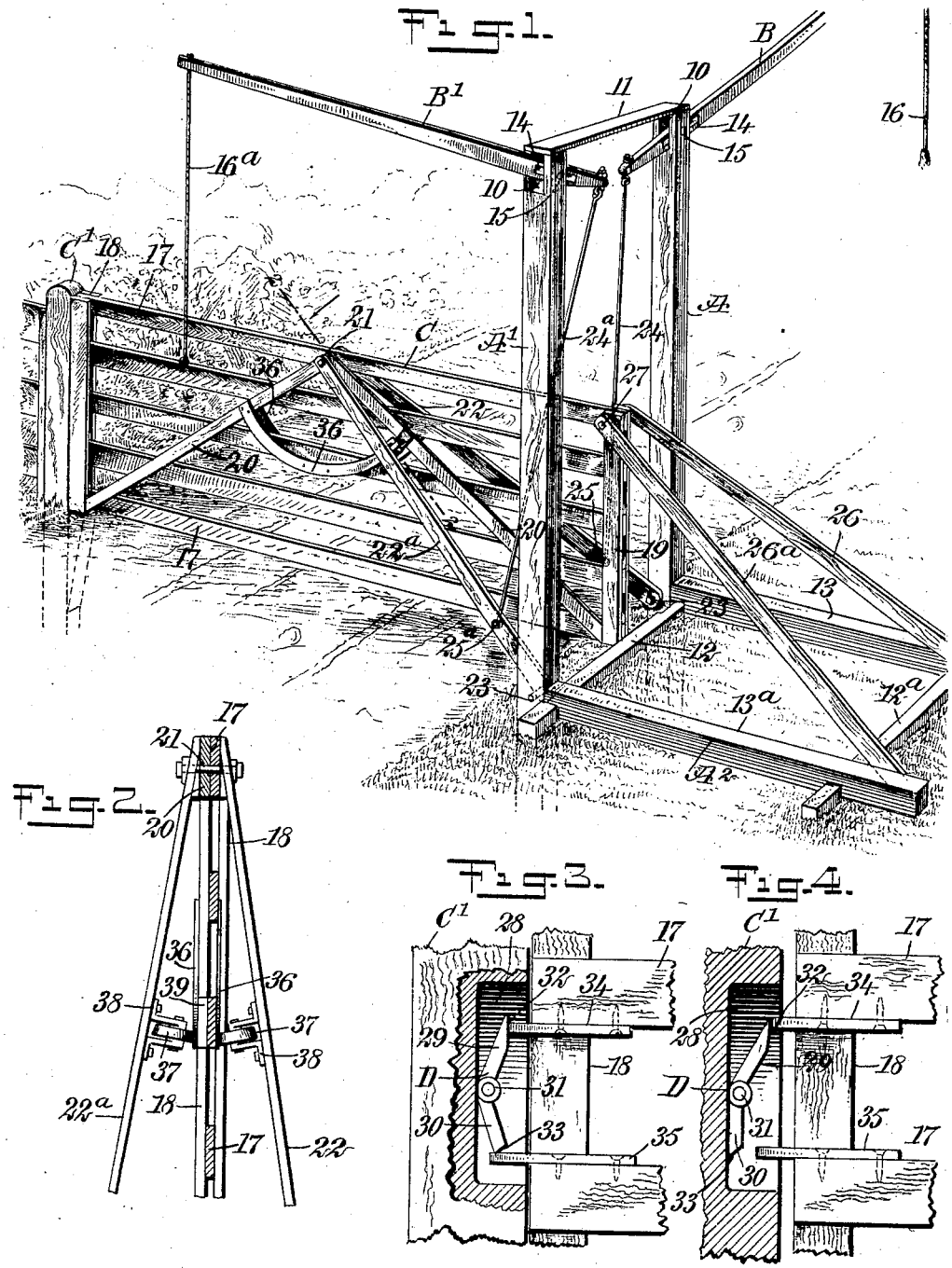

OSCAR E. CONAT, OF NORTH YAKIMA, WASHINGTON.

GATE.

No. 830,414.　　　　Specification of Letters Patent.　　　　Patented Sept. 4, 1906.

Application filed April 9, 1906. Serial No. 310,676.

*To all whom it may concern:*

Be it known that I, OSCAR E. CONAT, a citizen of the United States, and a resident of North Yakima, in the county of Yakima and State of Washington, have invented a new and Improved Gate, of which the following is a full, clear, and exact description.

The purpose of the invention is to provide a lever-operated gate or a farm-gate that will be perfectly safe, not liable to stop on a dead-center and return to a shut position while a person or vehicle is in transit through the gate, and also to so construct the gate that it will be light, simple, strong, and economic and so evenly balanced that it can be operated with ease by a child.

Another purpose of the invention is to provide an automatic latch which will effectually prevent the gate from being opened by stock and to so hang said gate that when closed its rear end will be protected and rendered inaccessible to stock and whereby when the gate is opened the full width between gate-posts will be available for vehicles as the gate and its accessories are entirely removed from their path.

Another feature of the invention is to provide simple and effective means for guiding the gate securely to a locking position with its keeper-post.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved gate closed. Fig. 2 is an enlarged section through the gate, taken substantially on the line 2 2 of Fig. 1. Fig. 3 is an enlarged sectional side elevation of the latch portion of the keeper-post and a side elevation of the latch portion of the gate, showing the gate closed and locked; and Fig. 4 is a view similar to that shown in Fig. 3, but illustrating the gate in the act of latching.

The gate is adapted to be operated from a vehicle, from on horseback, or by foot passengers by operating a lever on one side to open the gate and a second lever on the opposite side to close the gate.

A and A' represent two parallel uprights, which are located adjacent to a side of the roadway a suitable distance apart, and in the upper edge of each upright a vertical slot or opening 10 is produced, and said uprights are connected at the top by a suitable cross-bar 11. A spreader-bar 12 is secured to the rear lower portions of the uprights A and A', and parallel beams 13 and $13^a$ are secured to the spreader-bar 12 and to the inner or rear faces of the uprights A and A' and to a second spreader-bar $12^a$, parallel with the spreader-bar 12, thus forming a frame $A^2$, which rests upon the ground and is adapted to receive and support the gate C, to be hereinafter described, when the gate is fully opened.

A lever B is passed through the opening 10 in the upright A, and a second and corresponding lever B' is passed through the opening 10 of the upright A'. The shorter ends of these levers B and B' extend into the space between the uprights A and A' an equal distance, and in order that these levers shall not be readily worn out through constant use metal bars 14 are inserted in said levers near their inner ends, and the pivot-pins 15 for the said levers are passed through the said reinforcing-bars 14 and through the slotted portions of the uprights A and A', as is shown in Fig. 1. The lever B at its outer end has a rope 16 attached thereto, and the lever B' is provided with a corresponding rope $16^a$. These ropes are of sufficient length to extend within reach of pedestrians.

The gate C may be of any desired formation. Preferably, however, as shown, the gate consists of series of parallel longitudinal slats 17, held between front vertical bars 18 and rear vertical bars 19. Diagonal brace-bars 20 are secured to a side portion of the gate, extending from the lower corners of the gate upward in direction of each other, and these bars meet a few inches to the rear of the central portion of the upper slat 17 of the gate, as is shown in Fig. 1. Where the upper ends of the braces 20 connect, a pivot-bolt 21 is passed through them and the upper slat 17, and the upper ends of lifting-arms 22 and $22^a$ are pivoted on the said bolt, the lower ends of the said lifting-arms being pivoted, one to the bottom portion of the upright A and the other to the bottom portion of the upright A', at their inner or opposing faces, as is also shown in Fig. 1, said pivot-bolts being designated as 23.

A link 24 is pivotally connected with the inner end of the lever B, and a corresponding link 24ª is pivotally connected to the inner end of the lever B'. These links are carried downward, and one of them is pivoted, by means of a pivot-bolt 25, to the lifting-arm 22 at a point between its center and its rear end, preferably nearer the rear end than the center of the arm, and the other link 24ª is correspondingly pivotally attached by a bolt 25ª to the opposing lifting-arm 22ª, as is shown in Fig. 1.

Opposing steering-arms 26 and 26ª are pivotally connected by a bolt 27 to opposite sides of the upper rear corner of the gate C, and the lower ends of these steering-arms are pivotally attached to the rear or inner ends of the sills 13 and 13ª of the frame A². These steering-arms 26 and 26ª serve to direct the forward end of the gate to engagement with a keeper-post C', located at the opposite side of the roadway, when the said gate is closed and when the gate is open likewise tend to center the gate relatively to the frame A².

In operation if a steady pull is exerted on either of the ropes 16 or 16ª to open the gate and said pull is continued until the pivot-bolts 25 and 25ª, connecting the links 24 and 24ª with the lifting-arms 22 and 22ª, are in a true line above the bolts 23, connecting the said lifting-arms to the uprights A and A', then the gate will be about two inches back of the dead-center, and when tension on the rope is released the gate will at once fall back fully open, thereby rendering it impossible to stop the gate upon a dead-center, thus preventing its accidental return to a closed position when but partly open. By connecting the lifting-arms 22 and 22ª with the gate, as has been described, when the gate is closed, as shown in Fig. 1, the forward end of the gate will be in close engagement with the keeper-post C', and the rear end of the gate will be between the uprights A and A' and will therefore not be accessible to stock, and even should stock endeavor to raise the gate at such time the steering-arms 26 and 26ª would prevent such action. When the gate is open, its forward end will be just within the line of the outer faces of the uprights A and A'.

The keeper-post C', as is shown in Figs. 3 and 4, is provided near its upper end in its outer face with a longitudinal recess 28, and in this recess a keeper D is pivoted. This keeper is of angular construction and comprises an upper member 29 and a lower member 30, that diverge in an outward direction from their pivot 31 when the gate is closed, as is shown in Fig. 3. The upper member 29 of the keeper D is heavier than the lower arm 30, and its tendency will be to drop forward when not engaged until the lower member 30 is in engagement with the rear wall of the recess 28, which is the position of the keeper D when the gate is open, as is shown in Fig. 4.

The upper outer end portion 32 of the upper member 29 of the keeper is given a more or less lengthy inclination, and the lower end 33 of the lower member 30 is also inclined, but preferably to a lesser degree, as is shown in Figs. 3 and 4.

In connection with the keeper D two latch-bars 34 and 35 are employed. One of these latch-bars 34 is secured to the under face usually of the upper slat 17 of the gate, and the other bar 35 is secured to the upper edge of the next lower slat 17, as is also shown in Figs. 3 and 4, and both of said latch-bars 34 and 35 extend beyond the front edge of the gate, so that when the gate is closed they project some distance into the recess 28 in the keeper-post, and the bar 35 is made to extend a greater distance out from the gate than the upper bar 34. The gate in closing has a forward swinging or drop movement, and supposing the keeper D to be in its normal position (shown in Fig. 4) as the gate closes the outer end of the upper latch-bar 34 will engage the inclined surface 32 of the upper member 29 of the keeper and will force the same forward, and this action will cause the lower member 30 to ride up upon the upper face of the lower latch-bar 35 until when the gate is fully closed this lower member 30 of the keeper will be pressed firmly down upon the latch-bar 35, being held in such position by the engagement of the upper latch-bar with the upper member 29 of the keeper. Thus the gate is not only held firmly latched, but it is impossible for stock to force the gate upward or open the same after the gate has been once closed.

When the gate is opened, it moves upward and rearward from the keeper, and as the upper latch-bar 34 passes up the inclined surface 32 of the upper member of the keeper it gravitates outward and causes the lower member 30 to ride off from the lower latch-bar 35 until as the keeper becomes free from the latch-bars it assumes its normal position. (Shown in Fig. 4.) In order to guide the gate with accuracy in its movement to and from the latch, wherein, it will be observed, a proper engagement must be brought about between the keeper and the latch-bars, arched tracks 36, having their upper faces concaved, are secured to the outer faces of the brace-bars 20 and to the slats 17 of the gate at its opposite side, the two tracks 36 being in horizontal alinement one at each side of the gate, and beveled friction-rollers 37, having a downward pitch, engage with the outer faces of the tracks 36, the said friction-rollers being mounted in bearings 38, secured to the inner faces of the steering-arms 22 and 22ª between their centers and their upper ends, as is shown in both Figs. 1 and 2. The track 36, which is secured to the brace-bars 20, is supported at its central portion by a suitable spacing-block 39, as shown in Fig. 2.

Having thus described my invention, I claim as new and desire to secure by Letters Patent—

1. In a gate, the combination with spaced uprights, a gate-supporting frame secured to the bottom portion of the said uprights, levers fulcrumed in the upper ends of the uprights at one side of their centers, the shorter ends of the levers extending within the space between the uprights, and a gate independent of the said uprights and the said frame and adapted for lifting and swinging movement between the said uprights to and from the said frame, of lifting-arms pivoted to the lower portions of the said uprights and to the upper portion of the gate to the rear of its center, link connections between the levers and the said lifting-arms, the links being connected with the lifting-arms between their centers and the ends pivoted to the uprights, steering-arms pivoted to the upper rear corner portion of the gate and to the inner portion of the said frame, segmental tracks secured to opposite sides of the gate, and inclined beveled friction-rollers mounted upon the lifting-arms and engaging with the said tracks.

2. The combination with a gate, uprights located at each side of the gate, levers fulcrumed in the said uprights, lifting-arms pivoted to the uprights at their lower portions and to the gate at its upper portion at the rear of the center, links pivoted to the inner ends of the levers and to the lifting-arms adjacent to their ends connected with the uprights, and steering-arms pivotally attached to the rear upper portion of the gate and to the inner end of the said frame, of a keeper-post for the gate, having a recess in its front face, an angular keeper pivoted in the said recess, consisting of an upper and a lower arm at angles to each other, both arms facing outward and having their forward end portions beveled, the upper member being of greater width than the lower member, and latch-bars secured to the gate, extending beyond its forward edge, one of which latch-bars is adapted for operative engagement with the upper member of the keeper, the other of the latch-bars being adapted for locking engagement by the lower member of the keeper, as described.

In testimony whereof I have signed my name to this specification in the presence of two subscribing witnesses.

OSCAR E. CONAT.

Witnesses:
VESTAL SNYDER,
GRACE SMITH.